(12) United States Patent
Yokota et al.

(10) Patent No.: US 7,900,502 B2
(45) Date of Patent: Mar. 8, 2011

(54) SEAL CHECKER

(75) Inventors: Yuji Yokota, Shiga (JP); Seisaku Iwasa, Shiga (JP)

(73) Assignee: Ishida Co., Ltd., Kyoto (JP)

( * ) Notice: Subject to any disclaimer, the term of this patent is extended or adjusted under 35 U.S.C. 154(b) by 360 days.

(21) Appl. No.: 12/158,135

(22) PCT Filed: Dec. 20, 2006

(86) PCT No.: PCT/JP2006/325371
§ 371 (c)(1),
(2), (4) Date: Jun. 19, 2008

(87) PCT Pub. No.: WO2007/072854
PCT Pub. Date: Jun. 28, 2007

(65) Prior Publication Data
US 2009/0266148 A1  Oct. 29, 2009

(30) Foreign Application Priority Data
Dec. 22, 2005  (JP) .................. 2005-369193

(51) Int. Cl.
*G01N 3/36* (2006.01)
(52) U.S. Cl. .................................................. 73/49.3
(58) Field of Classification Search ........ 73/41, 52, 73/45.4, 49.3
See application file for complete search history.

(56) References Cited

U.S. PATENT DOCUMENTS

| | | | | |
|---|---|---|---|---|
| 4,697,452 A * | 10/1987 | Prakken | ................ | 73/49.3 |
| 4,922,746 A * | 5/1990 | Hulsman et al. | ............... | 73/49.3 |
| 4,955,226 A * | 9/1990 | Beaty et al. | ................... | 73/49.3 |
| 5,507,177 A * | 4/1996 | Focke | ................ | 73/49.3 |
| 5,533,385 A * | 7/1996 | Frievalt | ................ | 73/49.3 |
| 5,542,288 A * | 8/1996 | Fenlon | ................ | 73/49.3 |
| 5,767,392 A * | 6/1998 | Belcher et al. | ................... | 73/41 |
| 5,786,530 A * | 7/1998 | Fenlon | ................ | 73/49.3 |
| 6,330,823 B1 * | 12/2001 | Raymond | ................ | 73/52 |
| 6,474,141 B1 * | 11/2002 | Takaoka et al. | ................ | 73/49.3 |
| 6,941,796 B2 * | 9/2005 | Bennett | ................ | 73/49.3 |
| 7,107,823 B1 * | 9/2006 | Lovvorn | ................ | 73/49.3 |
| 7,156,238 B2 * | 1/2007 | Elbersen | ................ | 209/599 |

FOREIGN PATENT DOCUMENTS

| | | |
|---|---|---|
| JP | H04-142236 A | 5/1992 |
| JP | 2002-211521 A | 7/2002 |
| JP | 2003-156403 A | 5/2003 |
| JP | 2005-345176 A | 12/2005 |

* cited by examiner

*Primary Examiner* — John Fitzgerald
(74) *Attorney, Agent, or Firm* — Global IP Counselors, LLP

(57) ABSTRACT

A seal checker for conveying and pressing a packaging bag by upper and lower conveyance units is provided which is capable of saving space with a compact structure, and is also capable of improving maintainability and cleanability. A lower transfer conveyor is mounted on a main body frame, and an upper transfer conveyor is supported by an elevating mechanism mounted to the main body frame. The elevating mechanism includes first and second link members and a frame that connects upper end portions of the link members to each other. Lower portions of the first and second link members are connected to the main body frame. The frame is configured so as to move in parallel with the lower transfer conveyor.

8 Claims, 10 Drawing Sheets

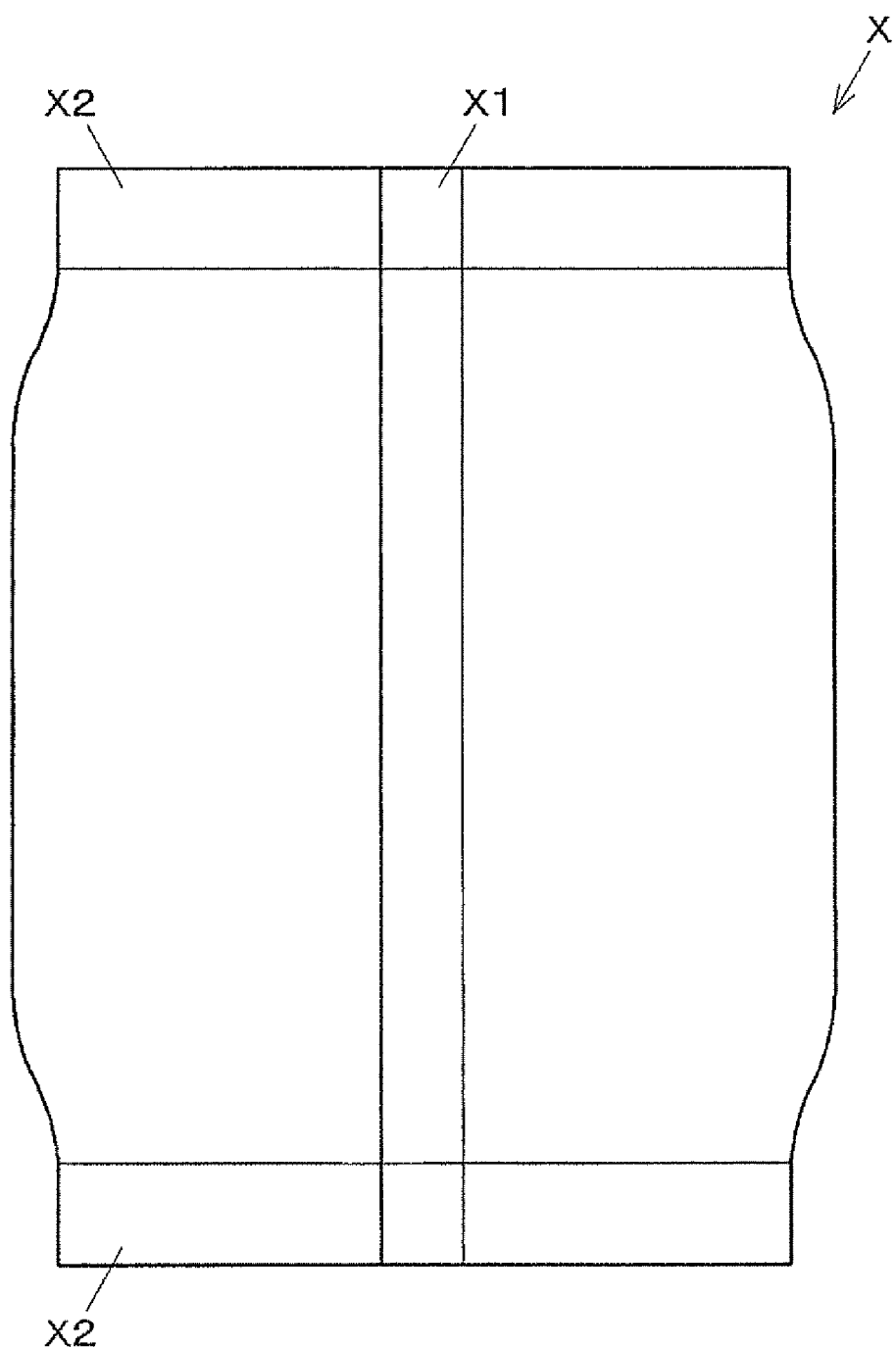
F I G. 1

SEAL CHECKER

CROSS-REFERENCE TO RELATED APPLICATIONS

This application claims priority to Japanese Patent Application No. 2005-369193 filed on Dec. 22, 2005. The entire disclosure of Japanese Patent Application No. 2005-369193 is hereby incorporated herein by reference.

TECHNICAL FIELD

The present invention relates to a seal checker configured to conduct a seal check of packaging bags by pressing the packaging bags. Furthermore, the present invention belongs to the technical field of quality inspection of packaging bags.

BACKGROUND ART

Generally, a packaging bag in which contents such as snack foods are packaged is subjected to a seal check in order to detect bags whose contents may quickly deteriorate due to a faulty seal. Devices that conduct such a seal check are, for example, the seal checkers disclosed in Japanese Patent Application Publication No. 2002-211521 and Japanese Patent Application Publication No. 2003-156403.

With the seal checkers disclosed in the above mentioned publications, in the course of conveying a packaging bag supplied from the upstream side of the seal checker while sandwiching the packaging bag between upper and lower transfer conveyors, the seal checker will press the packaging bag by using the upper transfer conveyor, and detect the displacement of the upper transfer conveyor or the reaction force to the pressure which acts on the upper transfer conveyor at the time of pressing, and thereby conduct the seal check of the packaging bag.

As an example, the seal checker described in Japanese Patent Application Publication No. 2002-211521 will be described. As shown in FIG. 12, this seal checker 100 includes lower and upper transfer conveyors 110, 120. First, the lower transfer conveyor 110 is supported by a mounting frame 100A and a double column support 100B, and includes rollers 111A, 111B disposed at both end portions and a conveyor belt 112 wound between the rollers 111A, 111B. On the other hand, the upper transfer conveyor 120 is supported by a pair of support plates 100C, 100C fixed to the upper portions of the double column support 100B extending upward from the mounting frame 100A. The upper transfer conveyor 120 includes seven rollers 121A to 121G and a conveyor belt 123 wound between these rollers 121A to 121G. The seven rollers 121A to 121G are arranged at illustrated positions between the support plates 100C, 100C and between a pair of frame members 122, 122 (only the one in front is shown) on the lower side.

In addition, a motor 131 is mounted to the lower portion of the double column support 100B. The power of this motor 131 is transmitted to the roller 111A of the lower transfer conveyor 110 via a first timing belt 132A wound as illustrated in the figure, and then transmitted to the roller 121F of the upper transfer conveyor 120 via the first timing belt 132A and second and third timing belts 132B, 132C wound as illustrated in the figure. As a result, the lower and upper conveyor belts 112, 123 will run so as to convey a packaging bag X in the arrow E7 direction.

In addition, an upper end portion of a first link member 141A inclined and extending upwardly to the upstream side from the roller 121B is coupled to the roller 121C. On the other hand, an upper end portion of a second link member 141B inclined and extending upwardly to the upstream side from the roller 121A is coupled to the roller 121G. In other words, the support plate 100C on the upper side, the frame member 122 on the lower side, and the first and second link members 141A, 141B together constitute a four-node parallel linkage mechanism L1 that moves in the direction as shown by the arrows with the support plate 100C serving as the supporting point.

In addition, a servo motor 151 is mounted to the support plate 100C on the upper side. The output shaft of the servo motor 151 is connected to the vicinity of a lower end portion of a link member 141A on the upstream side via a lever member 152A and an intermediate link member 152B. Accordingly, the supplied packaging bag X comes in contact with and pushes up the upper transfer conveyor 120, and subsequently is sandwiched and pressed between the transfer conveyors 110, 120. Then, the distance between the transfer conveyors 110, 120 when the packaging bag is pressed thereby is detected by the servo motor 151 via the movement of the parallel linkage mechanism L1, and the seal check of the packaging bag X is conducted based on the detection result.

DISCLOSURE OF THE INVENTION

With the seal checker 100 described in Japanese Patent Application Publication No. 2002-211521 as described above (see, FIG. 12), the upper transfer conveyor 120 is supported by the support plates 100C, 100C fixed to the double column support 110B extending upward from the mounting frame 100A. Accordingly, the seal checker 100 has a bulky structure as a whole, posing a problem in terms of space saving.

In addition, in maintenance and cleaning of the seal checker 100, even if the frame members 122 of the upper transfer conveyor 120 is removed, the double column support 100B, the support plates 100C, 100C, and the like still get in the way on the upper side so that removing the lower transfer conveyor 110 is troublesome. It is the same if the parallel linkage mechanism L1 is removed. Therefore, the seal checker 100has problems in terms of maintainability and cleanability.

The parallel relationship between the upper transfer conveyor 120 and the support plate 100C is maintained via the parallel linkage mechanism L1. The upper transfer conveyor 120 is supported by the support plates 100C, 100C, and the lower transfer conveyor 110 is supported by the mounting frame 100A and the double column support 100B. In other words, the transfer conveyors 110, 120 each are supported by a separate base, and the parallel relationship between the transfer conveyors 110 and 120must be achieved, for example, by an adjusting screw. Consequently, there is a problem that it is difficult to perform a precise seal check by maintaining the parallel relationship between the transfer conveyors 110, 120.

Therefore, it is an object of the present invention to provide a seal checker for conveying and pressing a packaging bag by upper and lower conveyance units, capable of saving space with a compact structure, and also capable of providing improved maintainability and cleanability. In addition, it is another object of the present invention to provide a seal checker in which the parallel relationship between the conveyance units is easily achieved and which performs a precise seal check.

The present invention adopts the following structure in order to solve the above described problems.

A seal checker according to a first aspect of the present invention comprises a support frame, an elevating mechanism, a pair of upper and lower conveyance units, a detection unit, and a determination unit. The elevating mechanism is mounted to the support frame. The pair of upper and lower conveyance units conveys and presses a packaging bag by sandwiching the same. The detection unit detects the distance between the upper and lower conveyance units or the load applied to the packaging bag when the packaging bag is pressed by the upper and lower conveyance units. The determination unit determines the seal properties of the packaging bag based on the distance or the load detected by the detection unit. The lower conveyance unit is mounted on the support frame. The upper conveyance unit is supported by the elevating mechanism.

A seal checker according to a second aspect of the present invention is the seal checker according to the first aspect of the present invention, wherein the elevating mechanism includes a pair of oscillating links and an intermediate link. The intermediate link connects the upper end portions of the both oscillating links to each other and moves in parallel with the lower conveyance unit. Lower portion (e.g., lower end portions or portions therenear) of the both oscillating links are connected to the support frame. The upper conveyance unit is supported by the intermediate link.

A seal checker according to a third aspect of the present invention is the seal checker according to the second aspect of the present invention, further comprising a driving source configured to drive both of the upper and lower conveyance units and a power transmission member. The driving source for the both conveyance units is mounted to the support frame. The power transmission member is disposed so as to extend to the upper conveyance unit via the elevating mechanism and configured to transmit the power from the driving source to the upper conveyance unit.

A seal checker according to a fourth aspect of the present invention is the seal checker according to the second aspect or the third aspect of the present invention, wherein the detection unit is mounted to the support frame and configured to detect the distance or the load based on movement of the elevating mechanism.

A seal checker according to a fifth aspect of the present invention is the seal checker according to any one of the second aspect through the fourth aspect of the present invention, wherein the intermediate link includes a lower member and an upper member. The lower member connects the upper end portions of both of the oscillating links. The upper member supports the upper conveyance unit. A spacer is interposed therebetween to expand the distance between the lower member and the upper member.

First, according to the first aspect of the present invention, the upper conveyance unit is supported by the elevating mechanism mounted to the support frame on which the lower conveyance unit is mounted, thus the need for disposing a member to support the upper conveyance unit above the lower conveyance unit can be eliminated. Accordingly, the seal checker of the first aspect will have a simple appearance with a compact structure instead of a bulky structure, allowing space saving.

Further, when the upper conveyance unit is removed, there is nothing that gets in the way above the lower conveyance unit, which consequently will create an open space. Therefore, the lower conveyance unit will be easily removed, and maintainability and cleanability will improve.

Next, according to the second aspect of the present invention, the elevating mechanism includes the pair of oscillating link and the intermediate link that connects the upper end portions of the both oscillating links to each other. The intermediate link is configured so as to move in parallel with the lower conveyance unit. Lower portions of the both oscillating links are connected to the support frame. The upper conveyance unit is supported by the intermediate link. Therefore, the parallel relationship between the upper and lower conveyance units can be easily achieved without involving troublesome work simply by connecting the upper conveyance unit to the support frame via the elevating mechanism, enabling to perform a precise seal check.

In addition, according to the third aspect of the present invention, the driving source for the both conveyance units is mounted to the support frame on the lower side, thus the structure of the upper conveyance unit will be simpler, achieving a further compact structure.

Further, the power transmission member configured to transmit the power from the driving source to the upper conveyance unit is disposed so as to extend to the upper conveyance unit by means of the elevating mechanism. Accordingly, with the seal checker of the third aspect, the need to use an extra member to arrange the power transmission member is eliminated, achieving a simpler structure and cost reduction.

In addition, according to the fourth aspect of the present invention, the detection unit configured to detect the distance or the load based on movement of the elevating mechanism is mounted to the support frame on the lower side, achieving a further compact structure of the upper conveyance unit. In other words, since the weight of the upper conveyance unit is reduced, when for example a servo motor is used as the detection unit, the load applied on the servo motor will be reduced. As a result, it will be possible to perform an accurate data detection and control of pressing, enabling a further precise seal check.

Further, according to the fifth aspect of the present invention, the intermediate link includes the lower member that connects the oscillating links and the upper member that supports the upper conveyance unit. Also, the spacer configured to expand the distance between these lower and upper members is interposed therebetween. Consequently, the seal checker of the fifth aspect is applicable to perform a seal check of a relatively thick packaging bag, since the distance between the upper and lower conveyance units is large. In addition, the seal checker of the fifth aspect is also applicable to perform a seal check of a relatively thin packaging bag by removing the spacer and thereby reducing the distance between the upper and lower conveyance units. In other words, a seal checker capable of flexibly responding to the thickness of a packaging bag can be achieved.

BRIEF DESCRIPTION OF THE DRAWINGS

FIG. 1 is a plan view of a packaging bag according to one embodiment of the present invention.

BEST MODE FOR CARRYING OUT THE INVENTION

Best embodiments of the present invention will now be explained with reference to the drawings.

As shown in FIG. 1, a packaging bag X described here is manufactured by forming a sheet-like wrapping material into a tube shape such that the edges of the wrapping material overlap, thermally sealing the overlapped portion of the tube shaped wrapping material in the lengthwise direction, and thermally sealing an upper portion and a lower portion of the tube shaped wrapping material in the lateral direction. In other words, this packaging bag X has a vertical seal portion X1 formed of end portions of the wrapping material facing each other and a pair of transverse seal portions X2, X2.

Figure 2:
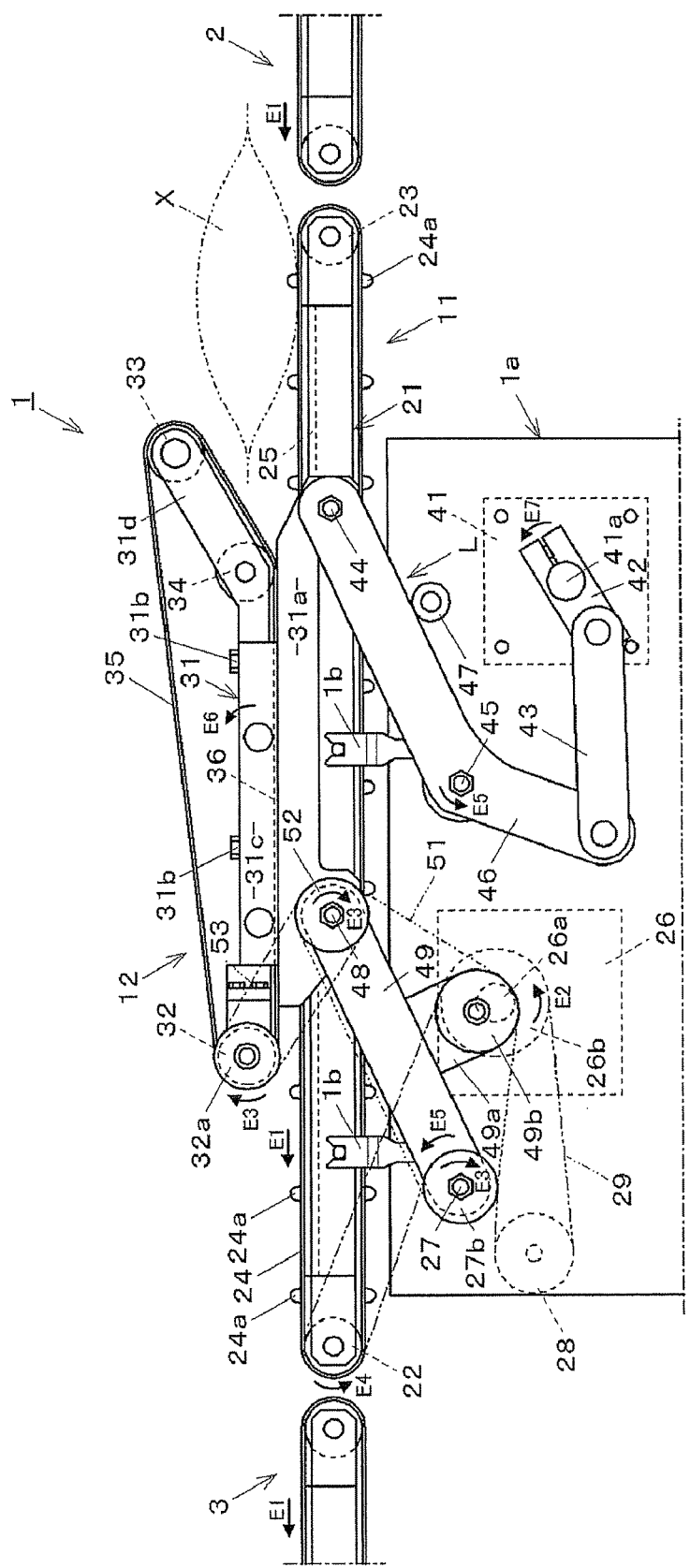
FIG. 2 is a side view of a seal checker according to the illustrated embodiment of the present invention.
Figure 3:
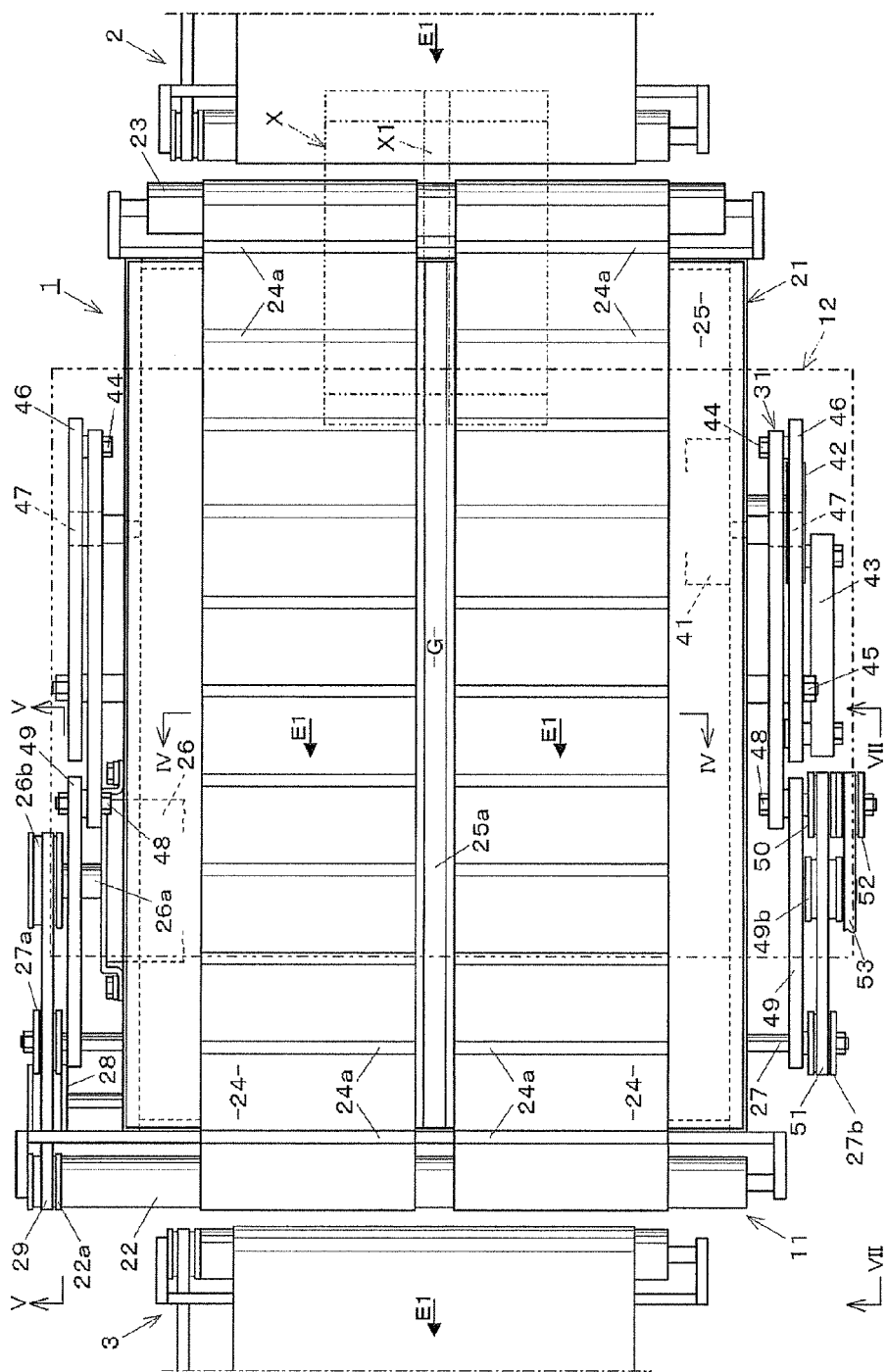
FIG. 3 is a top plan view of the seal checker shown in FIG. 2 according to the illustrated embodiment of the present invention shown without an upper transfer conveyor.

A seal checker 1 shown in FIGS. 2, 3 is disposed between a carry-in conveyor 2 on the upstream side and a carry-out conveyor 3 on the downstream side, and includes a lower transfer conveyor 11 (lower conveyance unit) and an upper transfer conveyor 12 (upper conveyance unit) disposed so as to face each other above and below. The packaging bag X is conveyed in the arrow E1 direction with the vertical seal portion X1 facing downward. Note that the "left" and "right" direction in the description below indicates the "left" and "right" direction respectively when the downstream side is viewed from the upstream side.

Figure 4:
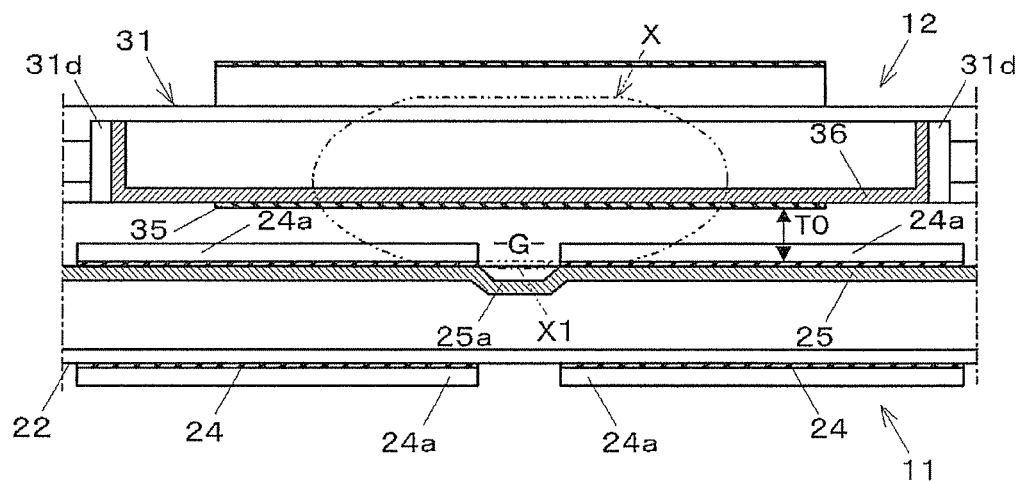
FIG. 4 is an enlarged schematic cross sectional view of a portion of the seal checker taken along a section line IV-IV in FIG. 3 according to the illustrated embodiment of the present invention.

As shown in FIGS. 2 to 4, the lower transfer conveyor 11 is removably mounted above a main body frame 1a (support frame) via a plurality of supporting members 1b ... 1b, and is configured to support and convey the packaging bag X from below. The lower transfer conveyor 11 includes a frame 21, a pair of rollers 22, 23 freely rotatably supported at both upstream and downstream end portions of the frame 21, and a pair of conveying belts 24, 24 wound around and extending between the rollers 22, 23. The pair of conveying belts 24, 24 is separated on the left and right with a gap G therebetween as shown in FIG. 3. The gap G is capable of accommodating the vertical seal portion X1 of the packaging bag X. Each conveying belt 24 has a plurality of projection members 24 ... 24a extending in a direction perpendicular to the conveyance direction E1, which are provided across the full length of the conveying belt 24 in the conveyance direction E1 with a predetermined gap between the projection members 24 ... 24a. On the upper surface of the frame 21, a top panel 25 is provided which supports the pair of conveying belts 24, 24. On the upper surface of the top panel 25, a recess groove 25a is provided which extends in the conveyance direction E1 at a position corresponding to the gap G between the conveying belts 24, 24 as shown in FIG. 4.

Figure 5:
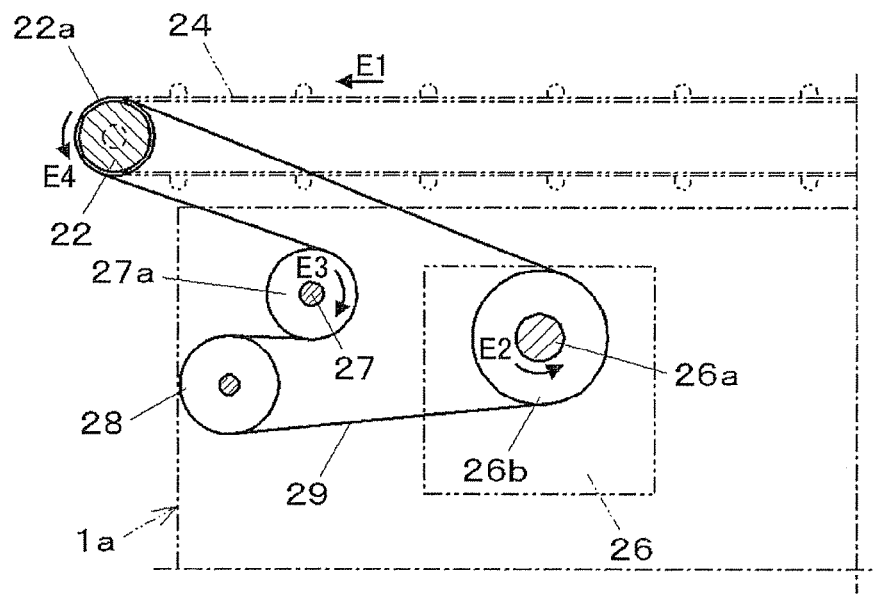
FIG. 5 is a schematic cross sectional view of a portion of the seal checker taken along a section line V-V in FIG. 3, illustrating a power transmission structure at a lower transfer conveyor according to the illustrated embodiment of the present invention.

As shown in FIGS. 2, 3, and 5, a motor 26 (driving source) is mounted on the right side of the main body frame 1a. A pulley 26b is mounted on an output axis 26a of the motor 26. A pulley 22a is mounted coaxially to the downstream side roller 22. A pulley 27a and a pulley 27b are mounted respectively on the right end and left end portions of a support shaft 27 that penetrates the main body frame 1a from left to right. A pulley 28 is disposed at a predetermined position on the right side of the main body frame 1a. As illustrated in the figures, a timing belt 29 is wound around the pulley 26b, the pulley 22a, the pulley 27a, and the pulley 28.

Consequently, when the pulley 26b on the motor 26 side rotates in the arrow E2 direction, the pulley 27a on the support shaft 27 side rotates in the arrow E3 direction, and simultaneously, the pulley 22a, i.e., the downstream side roller 22, rotates in the arrow E4 direction. Therefore, the conveying belts 24, 24 wound around and extending between the pair of rollers 22, 23 will run in the arrow E1 direction. Note that the pulley 28 serves to properly adjust the tension of the timing belt 29, and is capable of moving in the upstream and downstream directions.

Figure 6:
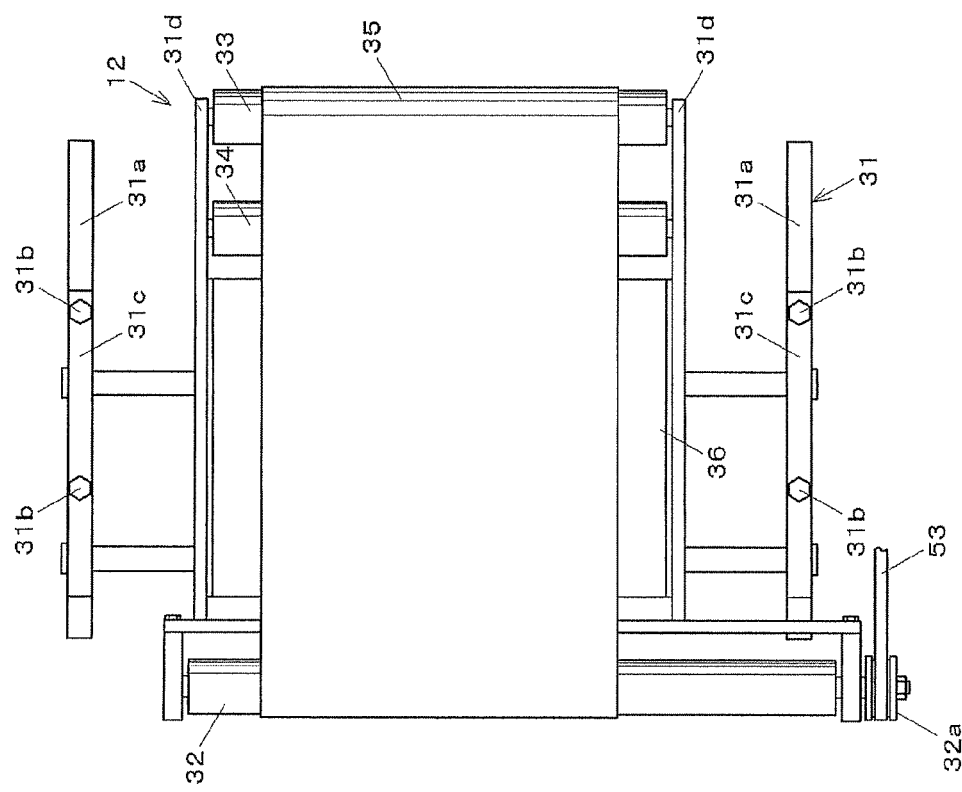
FIG. 6 is a top plan view of the upper transfer conveyor of the seal checker shown in FIGS. 2 and 3 in accordance with the illustrated embodiment of the present invention.

As shown in FIGS. 2, 4, and 6, the upper transfer conveyor 12 and the lower transfer conveyor 11 sandwich and press the packaging bag X therebetween, and the upper transfer conveyor 12 is supported by a frame 31 (intermediate link). The frame 31 includes a pair of left and right lower frame members 31a, 31a (lower member), upper frame members 31c, 31c (upper member) mounted on the lower frame members 31a, 31a by bolts 31b, 31b, and auxiliary frame members 31d, 31d connected to the upper frame members 31c, 31c.

Three rollers 33, 32, 34 are freely rotatably supported respectively at both upstream and downstream end portions and at a portion in the vicinity of the upstream end portion between the pair of auxiliary frame members 31d, 31d, and a conveying belt 35 is wound around and extending over the three rollers 32, 33, 34. A top panel 36 is provided which supports the conveying belt 35 between the rollers 32, 34. The upstream side roller 33 is arranged at a position higher than the roller 34, and the conveying belt 35 is inclined upward in the upstream direction across a predetermined range. In other words, the packaging bag X is smoothly introduced between the transfer conveyors 11, 12.

As shown in FIGS. 2 and 3, a servo motor 41 (detection unit) is disposed on the left side of the main body frame 1a on the upstream side. One end portion of a lever member 42 is mounted to an output axis 41a of the servo motor 41. Connected to the other end portion of the lever member 42 is one end portion of an intermediate link member 43 in a linear shape. Connected to the other end portion of the intermediate link member 43 is one end portion of a left side first link member 46 of a pair of left and right first link members 46, 46 (oscillating link) generally having a V shape. The other end portion of the left side first link member 46 is connected by a bolt 44 to the upstream side of the lower frame member 31a on the left side of the frame 31. In addition, one end portion of the right side first link member 46 is connected by the bolt 44 to the upstream side of the lower frame member 31a on the right side of the frame 31. The first link members 46, 46 oscillate in the arrow E5 direction about a support shaft 45 that penetrates the main body frame 1a from left to right. The upstream sides of the upper transfer conveyor 12 and the main body frame 1a are removably connected to each other via the lever member 42, the intermediate link member 43, and the first link members 46, 46.

Stoppers 47, 47 extend outward on both left and right sides of the main body frame 1a. The longer oscillating end portion of the first link member 46 that oscillates about the support shaft 45 will come into contact with the stopper 47 when the first link member 46 oscillates in the direction opposite from the arrow E5, thereby the bottom dead center of the upper transfer conveyor 12 is determined. Note that, as shown in FIG. 4, the initial value of the distance between the transfer conveyors 11, 12 when the upper transfer conveyor 12 reaches the bottom dead center is set to be T0 (see FIG. 4), and this distance T0 is narrower than the thickness of the packaging bag X carried into the seal checker 1.

In addition, on the downstream side, the downstream sides of the upper transfer conveyor 12 and the main body frame 1a are removably connected to each other via a pair of left and right second link members 49, 49 (oscillating link) generally having a linear shape, which oscillate in the arrow E5 direction about the support shaft 27. One end portions of each of the second link members 49, 49 are mounted to the left and right end portions of the support shaft 27, and the other end portions of each of the second link members 49, 49 are connected to the downstream side of the lower frame members 31a, 31a of the frame 31 by bolts 48, 48.

Consequently, a four-node parallel linkage mechanism L (elevating mechanism, support frame) is formed by the main body frame 1a on the lower side, the frame 31 on the upper side, i.e., the lower frame members 31a, 31a, and the first and second link members 46, 46, and 49, 49 on the upstream and downstream sides. The four-node parallel linkage mechanism L performs an elevating function of the upper transfer conveyor 12 by means of the lower frame members 31a, 31a and the first and second link members 46, 46, 49, 49 on the upstream and downstream sides. The upper transfer conveyor 12 is capable of moving in the arrow E6 direction while constantly maintaining a parallel relationship with respect to the lower transfer conveyor 11 via the linkage mechanism L.

When the upper transfer conveyor 12 is pushed up in the arrow E6 direction by the packaging bag X moving underneath, each of the first and second link members 46, 46 49, 49 oscillates in the arrow E5 direction. As a result, the output axis 41a of the servo motor 41 will rotate in the arrow E7 direction. In other words, such movement of the parallel linkage mechanism L i.e., the distance between the transfer conveyors 11, 12 can be detected via the rotation of the output axis 41a of the servo motor 41.

Figure 7:
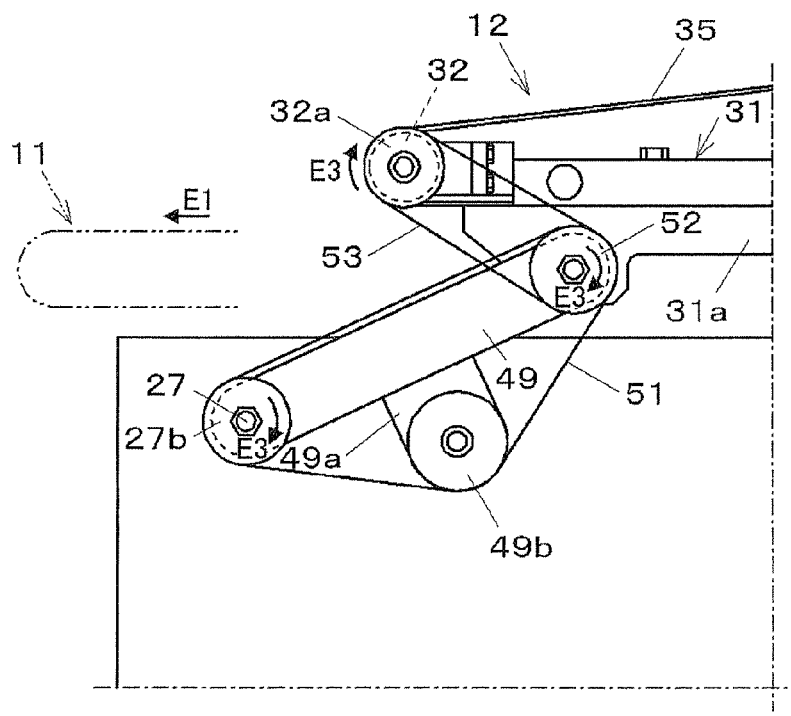
FIG. 7 is a side view of a portion of the seal checker taken along a section line VII-VII in FIG. 3, illustrating a power transmission structure to the upper transfer conveyor according to the illustrated embodiment of the present invention.

As shown in FIGS. 2, 3 and 7, a timing belt 51 (power transmission member) is wound around the pulley 27b, a pulley 49b, and a pulley 50. The pulley 27b is mounted to the left side of the support shaft 27. The pulley 49b extends outward on an extending portion 49a of the left side second link member 49. The pulley 50 is mounted to a support shaft that penetrates the second link member 49 in the vicinity of the downstream end portion on the left side of the lower frame member 31a of the frame 31. In other words, this timing belt 51 is disposed so as to extend to the upper transfer conveyor 12 via the second link member 49 of the parallel linkage mechanism L. Note that the pulley 49b serves to properly adjust the tension of the timing belt 51, and the location thereof can be moved.

In addition, as shown in FIGS. 2, 3, 6, and 7, a timing belt 53 (power transmission member) is wound around a pulley 52 mounted coaxially to the outer side of the pulley 50, and a pulley 32a mounted coaxially to the downstream side roller 32 of the upper transfer conveyor 12.

Accordingly, as shown in FIGS. 2, 5, and 7, when the pulley 26b on the motor 26 side rotates in the arrow E2 direction, the pulleys 27a, 27b on the support shaft 27 side and the pulleys 50, 52 on the frame 31 side will rotate in the arrow E3 direction. As a result, as shown in FIGS. 2 and 7, the pulley 32a, i.e., the downstream side roller 32 will rotate in the arrow E3 direction, and therefore the conveying belt 35 wound around and extending over the rollers 32, 33, 34 of the upper transfer conveyor 12 will run in the arrow E1 direction, the same as the conveying belts 24, 24 of the lower transfer conveyor 11.

Figure 8:
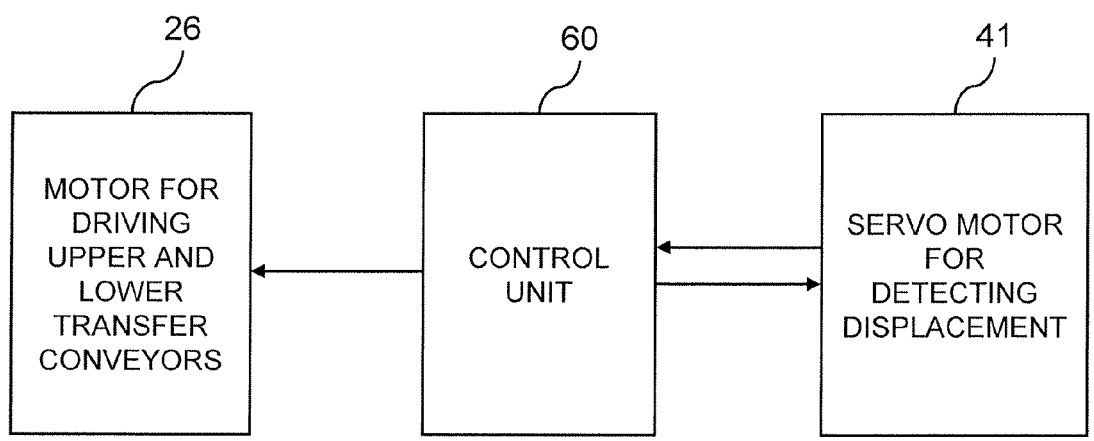
FIG. 8 is a block diagram of a control system of the seal checker according to the illustrated embodiment of the present invention.

Next, the control system of this seal checker 1 will be described. As shown in FIG. 8, a control unit 60 (determination unit) that controls the seal checker 1 outputs a control signal to the motor 26 that drives the upper and lower transfer conveyors 11, 12. In addition, the control unit 60 outputs to the servo motor 41a control signal which causes the transfer conveyors 11, 12 to press the packaging bag X with a predetermined pressing force. A detection signal with respect to the distance between the transfer conveyors 11, 12 when the packaging bag X is pressed is input from the servo motor 41 into the control unit 60. Then, the control unit 60 determines the seal properties (e.g., whether faulty seal exists or not) of the packaging bag X based on this detection signal.

Next, the operation of this seal checker 1 will be described.

As shown in FIGS. 2 to 4, the packaging bag X is carried into the seal checker 1 from the carry-in conveyor 2 such that the vertical seal portion X1 faces downward, and the vertical seal portion X1 is positioned in or over the gap G between the left and right conveying belts 24, 24 of the lower transfer conveyor 11 and the recess groove 25a of the top panel 25. The distance T0 (see FIG. 4) between the transfer conveyors 11, 12 in the initial state is narrower than the thickness of the packaging bag X, so that the upper transfer conveyor 12 will be raised in the arrow E6 direction as the packaging bag X moves below the upper transfer conveyor 12 in the arrow E1 direction.

Figure 9:
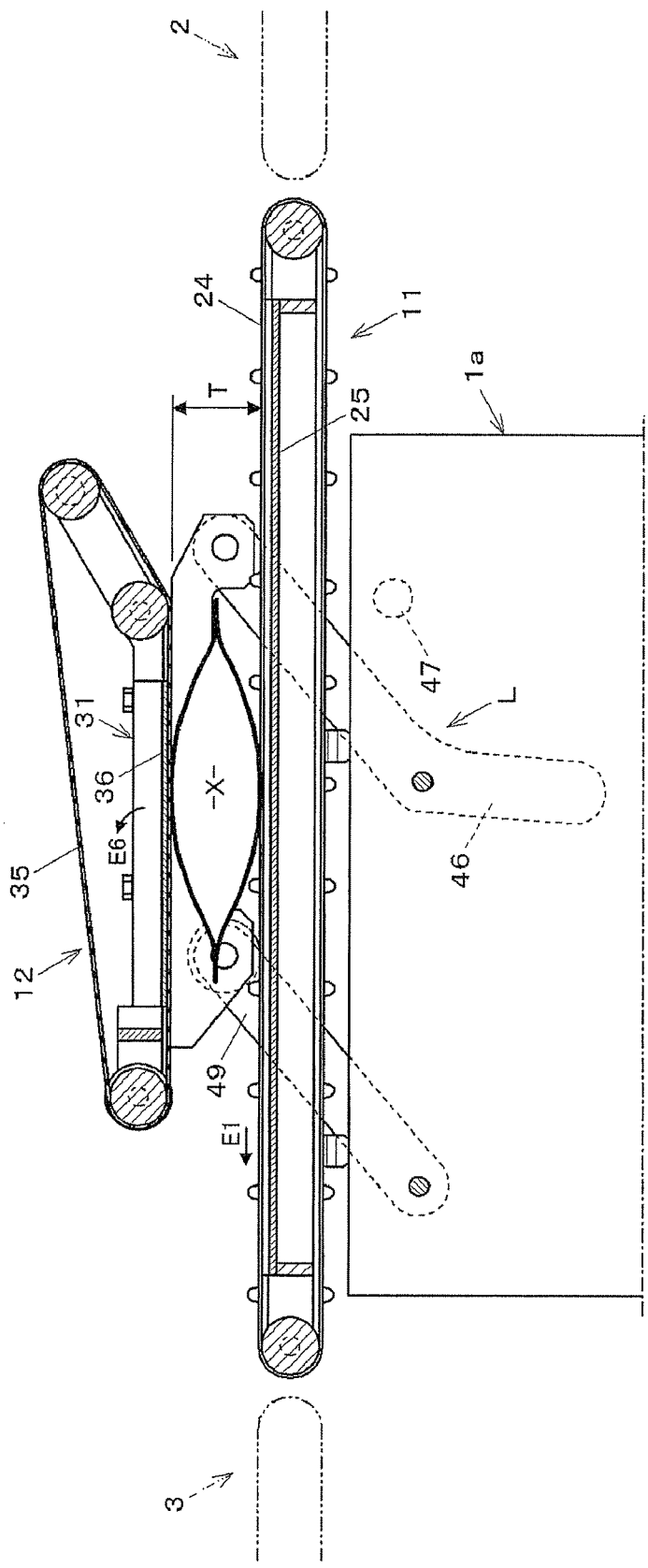
FIG. 9 is a schematic cross sectional view of the upper and lower transfer conveyors at the time of pressing the packaging bag according to the illustrated embodiment of the present invention.

In this case, as shown in FIG. 9, the four-node parallel linkage mechanism L including the main body frame 1a, the frame 31, and the first and second link members 46, 46, 49, 49, is formed between the lower transfer conveyor 11 and the upper transfer conveyor 12 supported by the main body frame 1a. Accordingly, the upper transfer conveyor 12 will be raised in the arrow E6 direction by the packaging bag X delivered from the carry-in conveyor 2 and moving below the upper transfer conveyor 12. Note that the longer oscillating end portion of the first link member 46 is away from the stopper 47.

In addition, as shown in FIGS. 2, 5, and 7, the power of the motor 26 mounted to the main body frame 1a on the lower side is transmitted to the downstream side roller 22 of the lower transfer conveyor 11 and the downstream side roller 32 of the upper transfer conveyor 12 via the timing belts 29, 51, 53. As a result, as shown in FIG. 9, the packaging bag X sandwiched between the upper and lower conveying belts 24, 24, 35 and the top panels 25, 36 is conveyed in a stable manner in the arrow E1 direction.

In addition, the packaging bag X is sandwiched between the conveying belts 24, 24 and the top panel 25 of the lower transfer conveyor 11 and the conveying belt 35 and the top panel 36 of the upper transfer conveyor 12, and also is pressed with a predetermined pressing force via the servo motor 41. The distance T (see FIG. 9) between the transfer conveyors 11, 12 at the time of pressing is detected by the servo motor 41 via the oscillation of the first link member 46, the intermediate link member 43, and the lever member 42. The control unit 60 determines the seal properties of the packaging bag X based on the detection signal. In other words, if the distance T rapidly decreases at the time of pressing, it will be determined to be a faulty seal.

Figure 10:
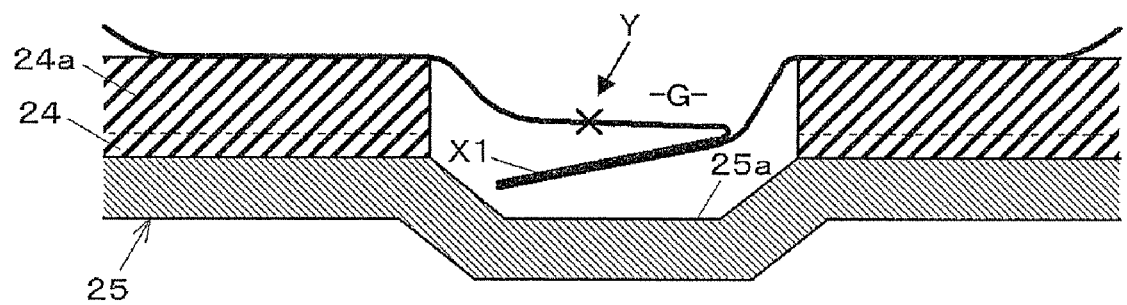
FIG. 10 is a schematic cross sectional view which explains the effect of providing a gap between the conveying belts, projection members, and a recess groove on a top panel of the lower transfer conveyor according to the illustrated embodiment of the present invention.

As clearly shown in FIG. 10, the conveyor belts 24, 24 of the lower transfer conveyor 11 are separately disposed with the gap G therebetween. The conveying belts 24, 24 are provided with projection members 24a ... 24a in the vicinity of the gap G. The top panel 25 has a recess groove 25a formed so as to correspond to the gap G. Accordingly, even when there is a defect in the vertical seal portion X1 or in a portion Y which is covered by the vertical seal portion X1, such a defect will not be covered, and an escape path for air and the like inside the packaging bag X to the exterior will be ensured at the time of pressing, therefore enabling reliable detection of a faulty seal.

In other words, the vertical seal portion X1 of the packaging bag X pressed by the upper and lower transfer conveyors 11, 12 will be inserted in the gap G. Consequently, at the time of pressing, a portion of the vertical seal portion X1 will be inserted in the gap G and expanded, and a portion in the vicinity of the vertical seal portion X1 will be pushed up by the projection members 24a ... 24a. As a result, complicated deformation will occur at and in the vicinity of the vertical seal portion X1, which will facilitate the detection of defects, if there are any, at the vertical seal portion X1 or the portion Y covered by the vertical seal portion X1. In addition, the top panel 25 is provided with the recess groove 25a, which will consequently ensure a sufficient depth for enabling the vertical seal portion X1 to be inserted therein. Providing the recess groove 25a to the top panel 25 is preferable, especially when the conveying belts 24, 24 having a thin thickness are used. This configuration will further facilitate the above described effects of the present invention, which result from complicated deformation at and in the vicinity of the vertical seal portion X1.

Then, as shown in FIG. 9, the packaging bag X released from the state of being pressed by both transfer conveyors 11, 12 is delivered to the carry-out conveyor 3, and further conveyed to the downstream side processes. Note that when pressing the packaging bag X is finished, the upper transfer conveyor 12 moves in the opposite direction from arrow E6 via the parallel linkage mechanism L, and the distance T between the transfer conveyors 11, 12 will return to the initial value T0 (see FIG. 4).

As described above, the upper transfer conveyor 12 is supported by the elevating mechanism mounted to the main body frame 1a on which the lower transfer conveyor 11 is mounted. Accordingly, the need for disposing a member to support the upper transfer conveyor 12 above the lower transfer conveyor 11 is eliminated, and the seal checker 1 has a simple appearance with a compact structure instead of a bulky structure, allowing space saving.

Further, when the upper transfer conveyor 12 is removed, there is nothing that gets in the way above the lower transfer conveyor 11, thus an open space will be created. Therefore, the lower transfer conveyor 11 will be easily removed, and maintainability and cleanability will improve.

In addition, the elevating mechanism that supports the upper transfer conveyor 12 includes the first and second link members 46, 49 and the frame 31 that connects the upper end portions of the link members 46, 49 to each other. The frame 31 is configured so as to move in parallel with the lower transfer conveyor 11. The lower end portions or portions therenear of the link members 46, 49 are connected to the main body frame 1a via the support shafts 27, 45. The upper transfer conveyor 12 is supported by the frame 31. Therefore, the parallel relationship between the upper and lower transfer conveyors 11, 12 can be easily achieved without involving troublesome work simply by connecting the upper transfer conveyor 12 to the main body frame 1a via the elevating mechanism, thus enabling to perform a precise seal check.

In addition, the motor 26 serving as the driving source for the transfer conveyors 11, 12 is mounted to the main body frame 1a on the lower side, the structure of the upper transfer conveyor 12 will be simpler, achieving a further compact structure. Note that since both transfer conveyors 11, 12 are driven by the single motor 26, the drive can be controlled in a more simplified manner and at lower cost.

Further, the timing belt 51 that transmits the power from the motor 26 to the upper transfer conveyor 12 is disposed so as to extend to the upper transfer conveyor 12 by means of the second link member 49 of the parallel linkage mechanism L. Accordingly, the need to use an extra member to arrange the timing belt 51 is eliminated, thus achieving a simple structure and cost reduction.

Further, since the servo motor 41 as the detection unit is mounted to the main body frame 1a on the lower side, a further compact structure of the upper transfer conveyor 12 can be achieved. In addition, as described above, since the weight of the upper transfer conveyor 12 is reduced, the load imposed on the servo motor 41 that detects the distance T based on the movement of the parallel linkage mechanism L is reduced. As a result, it will be possible to perform an accurate data detection and control of pressing, enabling a further precise seal check.

Figure 11:
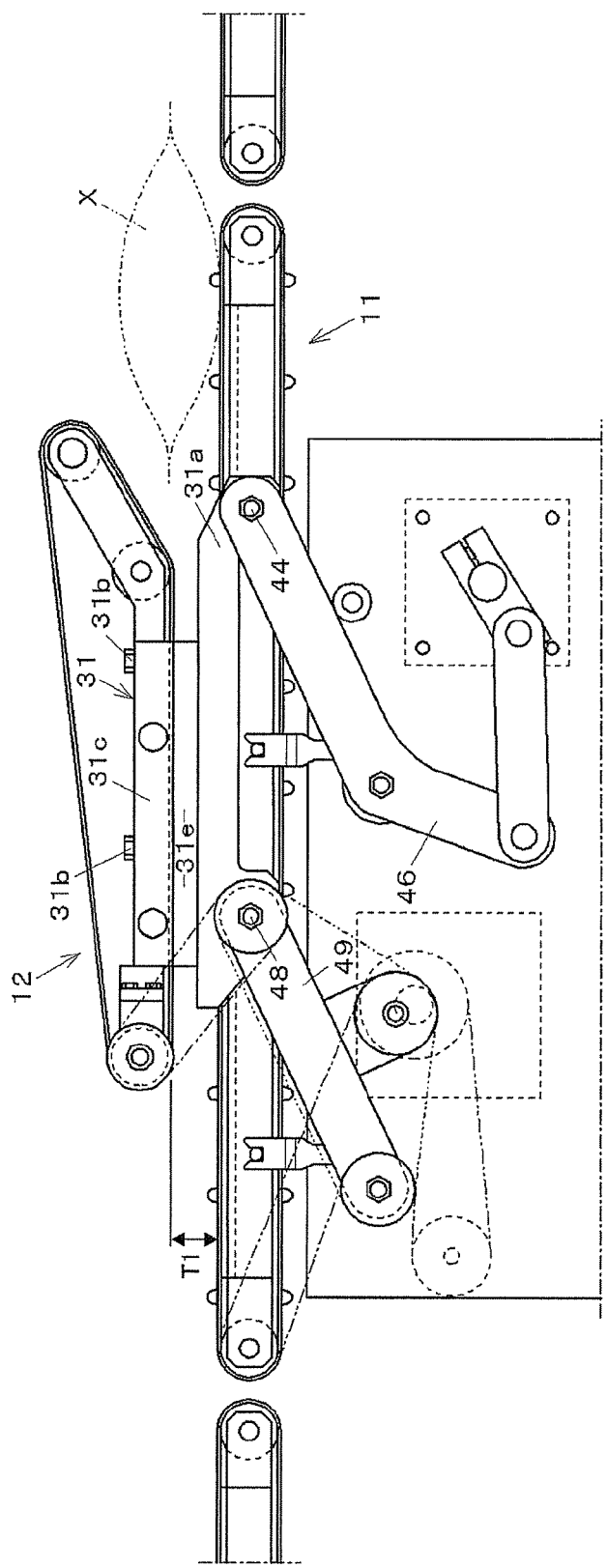
FIG. 11 is a side view of upper and lower frame members of the seal checker with a spacer interposed therebetween according to the illustrated embodiment of the present invention.
Figure 12:
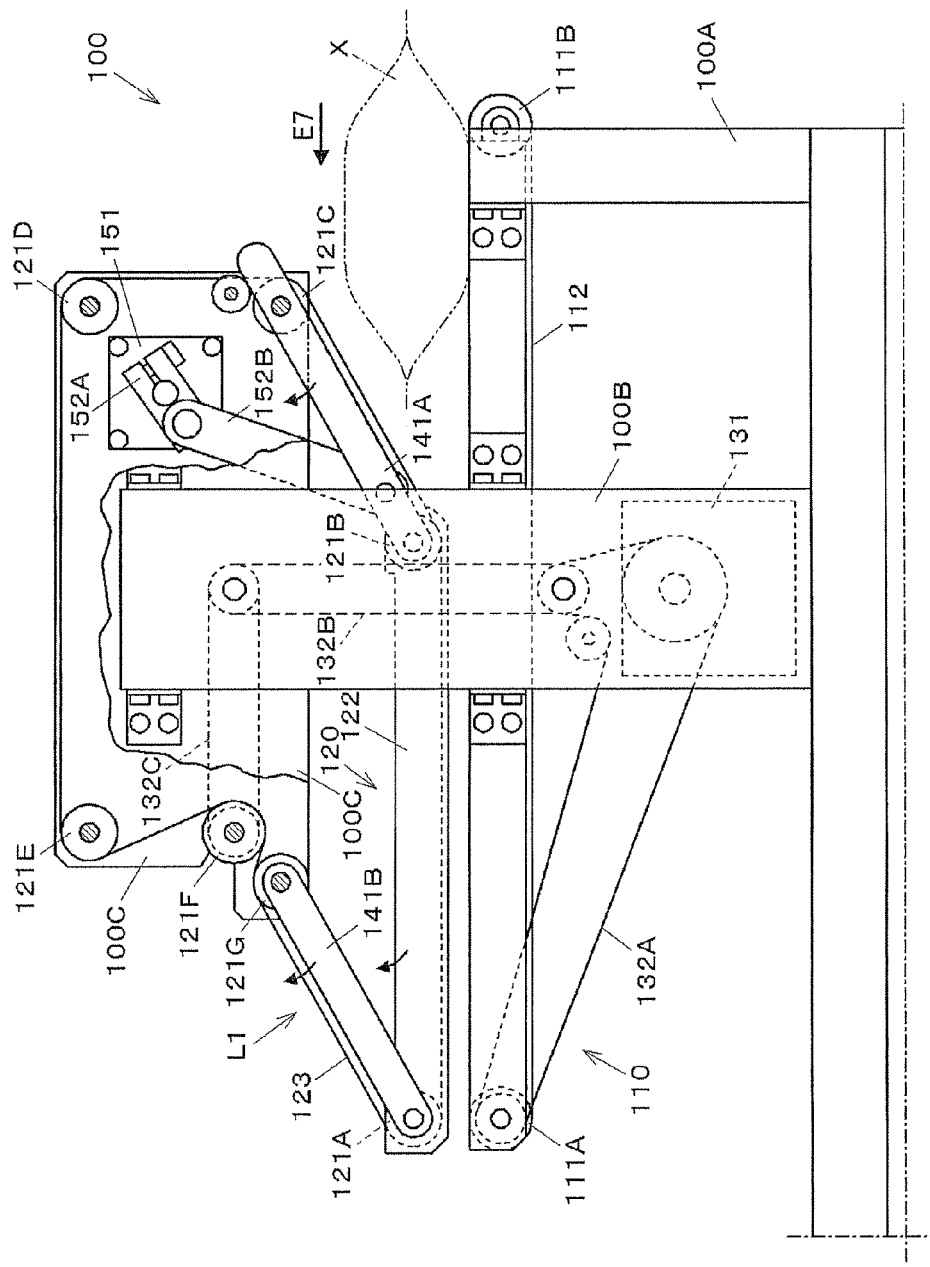
FIG. 12 is a lateral view of a comparison example of a seal checker.

Further, as shown in FIG. 11, the frame 31 as the intermediate link that constitutes the parallel linkage mechanism L includes the lower frame member 31a that connects the first and second link members 46, 49 by the bolts 44, 48 and the upper frame member 31c that supports the upper transfer conveyor 12. The both frame members 31a, 31c are configured so as to be removable by loosing the bolt 31b. Therefore, the spacer 31e configured to expand the distance between the frame members 31a, 31c can be easily interposed therebetween.

The seal checker 1 will be applicable to perform a seal check of a relatively thick packaging bag X when the spacer 31e is interposed and thus the distance T1 between the upper and lower transfer conveyors 11, 12 becomes larger. In addition, the seal checker 1 will be applicable to perform a seal check of a relatively thin packaging bag X when the spacer 31e is removed and thus the distance T1 between the upper and lower transfer conveyors 11, 12 becomes smaller. In other words, the seal checker 1 is capable of flexibly responding to the thickness of the packaging bag X. As an example, the seal checker 1 without the spacer 31e is suitable for use in seal checking of the packaging bag X having the thickness of 10 mm to 80 mm, while the seal checker 1 with the spacer 31e is suitable for use in seal checking of the packaging bag X having the thickness of 40 mm to 110 mm.

Note that the present invention is not limited to the embodiments described in detail above, and various modifications and variations can be made which fall within the spirit and scope of the invention. For example, the seal properties of the packaging bag X may be determined by causing servo motor 41 to keep a predetermined space between the upper and lower transfer conveyors 11, 12 while the packaging bag X is pressed thereby, and further by causing the servo motor 41 to detect the reaction force from the packaging bag X.

As described above, according to the present invention, a seal checker for conveying and pressing a packaging bag by upper and lower conveyance units is provided which is capable of saving space with a compact structure, and which is also capable of improving maintainability and cleanability. In addition, with the present invention, the parallel relationship between the conveyance units is easily achieved and a precise seal check can be performed. Therefore, the present invention relates to a seal checker configured to conduct a seal check of packaging bags by pressing the packaging bags, and is suitably applicable to a broad range of technical field of quality inspection of packaging bags.

The invention claimed is:

1. A seal checker comprising:
   a support frame;
   an elevating mechanism mounted to the support frame;
   a pair of upper and lower conveyance units disposed above the support frame configured to convey and press a packaging bag by sandwiching the packaging bag therebetween, the lower conveyance unit being mounted on the support frame and the upper conveyance unit being supported by the elevating mechanism;
   a detection unit configured to detect at least one of a distance between the upper and lower conveyance units and a load applied to the packaging bag when the packaging bag is pressed by the upper and lower conveyance units, the detection unit including a motor; and
   a determination unit configured to determine seal properties of the packaging bag based on the at least one of the distance and the load detected by the detection unit,
   the elevating mechanism including
      first and second oscillating links connected to the support frame,
      an intermediate link connecting upper end portions of the first and second oscillating links to each other, and configured to move in parallel with the lower conveyance unit with the upper conveyance unit being supported by the intermediate link, and
      a lower link member connecting the first oscillating link to an output axis of the motor of the detection unit so that rotation of the output axis of the motor causes the first and second oscillating links to elevate the upper conveyance unit,
   the detection unit being configured to drive the motor to operate the elevating mechanism so that a predetermined space is maintained between the upper and lower conveyance units.

2. The seal checker according to claim 1, wherein
   an intermediate portion of the first oscillating link is connected to the support frame and a lower portion of the second oscillating link is connected to the support frame.

3. The seal checker according to claim 1, wherein
   the detection unit is mounted to the support frame and configured to detect the at least one of the distance and the load based on movement of the elevating mechanism.

4. The seal checker according to claim 1, wherein
   the intermediate link includes
      a lower member connecting the upper end portions of the oscillating links,
      an upper member supporting the upper conveyance unit, and
      a spacer interposed between the lower member and the upper member to expand a distance between the lower member and the upper member.

5. The seal checker according to claim 1, wherein
   the detection unit is configured to detect the load applied to the packaging bag by detecting a reaction force from the packaging bag when the packaging bag is pressed by the upper and lower conveyance units.

6. The seal checker according to claim 1, further comprising
   a driving source configured to drive both of the upper and lower conveyance units, the driving source being mounted to the support frame, and
   a power transmission member disposed so as to extend to the upper conveyance unit via the elevating mechanism and configured to transmit power from the driving source to the upper conveyance unit.

7. The seal checker according to claim 6, wherein
   the detection unit is mounted to the support frame and configured to detect the at least one of the distance and the load based on movement of the elevating mechanism.

8. The seal checker according to claim 7, wherein
   the intermediate link includes
      a lower member connecting the upper end portions of the oscillating links,
      an upper member supporting the upper conveyance unit, and
      a spacer interposed between the lower member and the upper member to expand a distance between the lower member and the upper member.

* * * * *